Nov. 20, 1934.   H. E. BUCKLEN   1,981,610
ENGINE
Filed May 27, 1932   3 Sheets-Sheet 1

Inventor:
Herbert E. Bucklen.

Nov. 20, 1934. H. E. BUCKLEN 1,981,610
ENGINE
Filed May 27, 1932  3 Sheets-Sheet 2
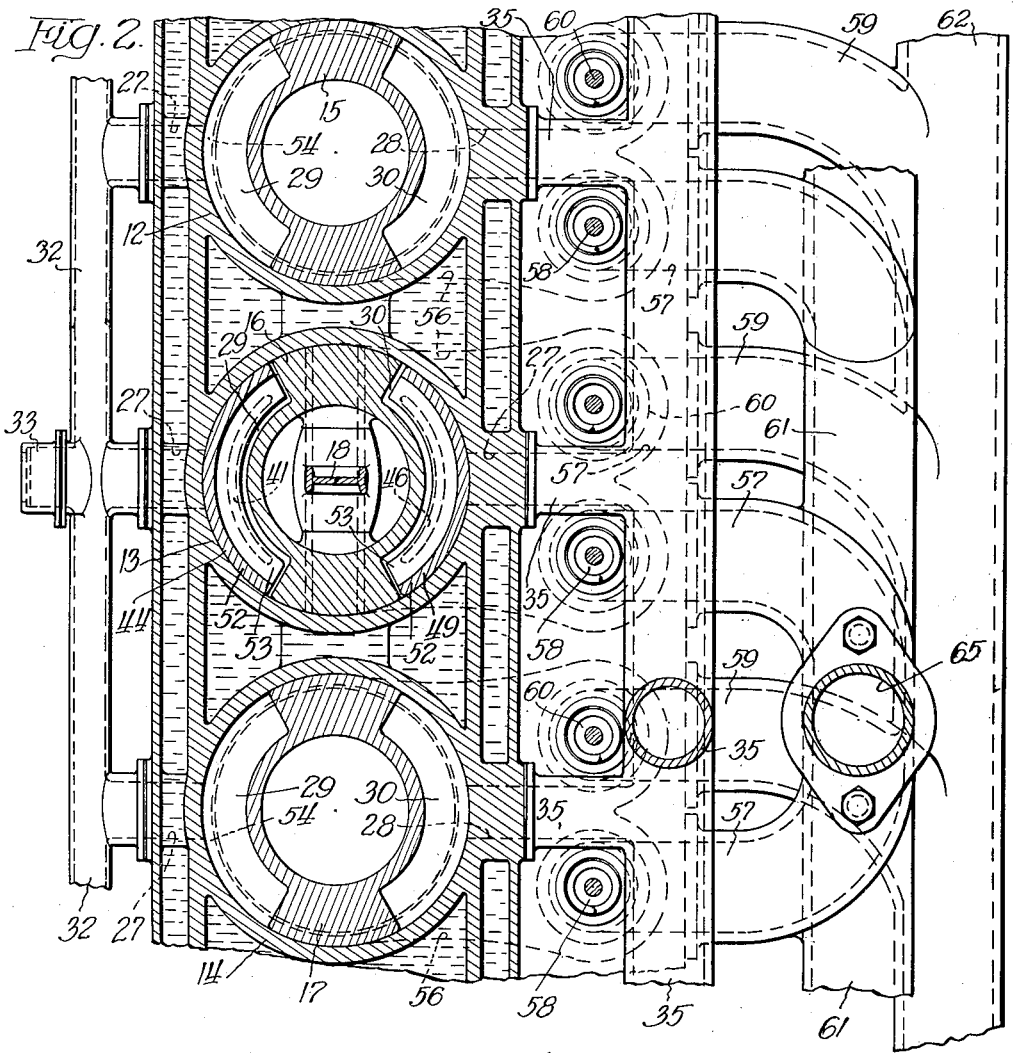

Nov. 20, 1934.  H. E. BUCKLEN  1,981,610
ENGINE
Filed May 27, 1932  3 Sheets-Sheet 3

Inventor:
Herbert E. Bucklen.
By Brown Jackson Boettcher Dienner
Attys.

Patented Nov. 20, 1934

1,981,610

UNITED STATES PATENT OFFICE 1,981,610

ENGINE

Herbert E. Bucklen, Elkhart, Ind., assignor of one-half to John A. Dienner, Evanston, Ill.

Application May 27, 1932, Serial No. 613,797

6 Claims. (Cl. 123—75)

The present invention relates generally to internal combustion engines, and particularly to means for supercharging the same.

It is a primary object of my present invention to utilize the space within the crank case of an engine as a supercharger.

The present invention contemplates the provision of a supercharger for a four-stroke-cycle engine by adapting the space below the pistons to function as a compressor for the gas, and to thereby avoid the necessity of providing auxiliary equipment for this purpose. The air or fuel is drawn into the crank case of the engine to be compressed and is delivered therefrom to the intake manifold at a pressure greater than atmosphere.

It is old and well known in the art to admit the fuel to the crank case of a two-stroke-cycle engine and to conduct it therefrom to the combustion chamber, but this manner of handling the gaseous fuel of a two-stroke-cycle engine is not supercharging.

In a two-stroke-cycle engine, the air is simply displaced by the piston so that it flows around the same out of the crank case and into the combustion chamber without any supercharging effect whatever. However, in a four-stroke-cycle engine, fuel is admitted to the explosion chamber only on alternate down strokes of the piston, while the compression action of the crank case will deliver air on every down stroke. The total volumetric displacement of air from the crank case will therefore be substantially twice that of the air admitted to the combustion chamber. Consequently, a compression of the air must take place and a supercharging of the engine results.

In order to acquaint those skilled in the art with the teachings and practice of my invention, I shall now describe a specific embodiment of the same, reference being had to the accompanying drawings which form a part of the specification.

I have herein illustrated my invention as it is applied to an internal combustion engine of the explosion type, but it will be readily apparent to those skilled in the art that the same may be employed with other types of engines.

In the drawings:

Figure 2 is a cross section thereof taken along the line 2—2 and looking in the direction of the arrows;

Figure 3 is a perspective view of a detail of Fig. 1;

Figure 5 is a fragmentary sectional view showing a modification of the valve arrangement of Fig. 1.

Figure 1:
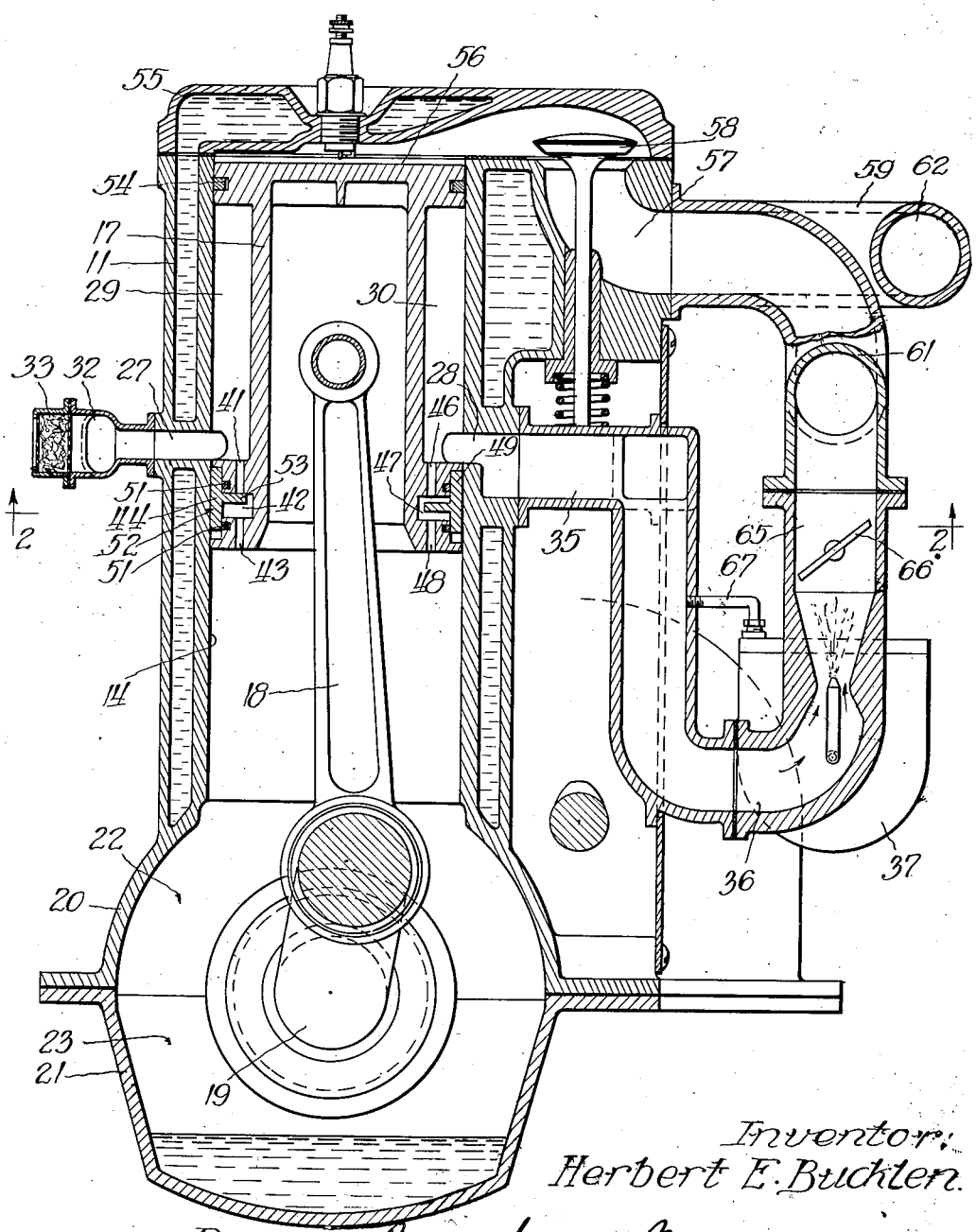
Figure 1 is a schematic sectional elevation of an engine embodying my invention.

Referring to Figures 1 and 2, I have illustrated a portion of a four-stroke-cycle internal combustion engine of the explosion type. A cylinder block 11 is provided with a plurality of cylindrical bores 12, 13 and 14, in which are fitted pistons 15, 16 and 17. The piston 17 is connected by means of a connecting rod 18 to a crank shaft 19, and the other pistons are similarly connected thereto. The cylinder block terminates at its lower end in a skirt 20 to which is secured a crank case 21. The skirt 20 is provided with partitions 22, and the crank case 18 is provided with corresponding partitions 23 registering therewith. These partitions are positioned between the adjacent cylinders. Thus each cylinder has its own separate compression space which is partitioned and sealed off from that of each of the other cylinders of the engine.

The cylinder 14 is provided with side ports 27 and 28, and the piston 16 has recesses 29 and 30, which register with the respective ports. The port 27 communicates with an air intake manifold 32, which is provided with an air cleaner 33. The port 28 communicates with an air manifold 35 which is connected to the air intake passage 36 of a carburetor 37.

The recesses 29 and 30 in the piston do not communicate with each other, but each communicates with the compression space in the crank case. A passageway 41 leads from the space 29 into a T-shaped groove 42, from which another passageway 43 opens into the space below the piston. The groove 42 contains a T-shaped arcuate valve 44 which is shiftable within the groove 42 to cover and uncover the passageway 41. Similarly the space 30 communicates by means of a passageway 46 with a similar groove 47 which in turn communicates by means of a passageway 48 with the space below the piston, a valve member 49 being shiftable within the groove 47 to cover and uncover the passageway 48. The valve members 44 and 49 are shifted within their respective grooves in response to the movement of the piston, due to the friction which they exert against the cylinder walls. Resilient members 51 are provided to maintain them in firm contact therewith.

Figure 3 shows one of the T-shaped arcuate valves in perspective. It consists of a semi-cylindrical body portion 52 and a radial tongue 53.

As shown in Figure 1, the body portion 52 engages the cylinder wall, and the tongue 53 extends into the base of the valve groove 42 where it overlies the valve aperture.

The piston 16 is shown as being provided with a sealing ring 54.

The cylinder block 11 is surmounted by a cylinder head 55, which closes the tops of the cylinders to define explosion chambers 56 therein in the usual manner. Each explosion chamber is provided with an intake duct 57 having a suitable valve 58, and an exhaust duct 59 having a similar valve 60. The several intake ducts communicate with a common intake manifold 61 to which is connected the outlet fuel duct 65 of the carburetor 37, and the exhaust ducts 59 all open into a common exhaust manifold 62 in the usual manner.

The outlet duct 65 of the carburetor is provided with the usual butterfly valve 66 for controlling the flow of fuel to the engine. A tube 67 leads from the air manifold 35 to the top of the float chamber of the carburetor to equalize the air pressure on the body of fuel therein and to thereby prevent the pressure of the compressed air from disturbing the delivery of fuel into the air stream.

In operation the piston 17 moves up and down in the cylinder 14 and the intake and exhaust valves 58 and 60 of the combustion chamber are operated in timed relation therewith, according to the usual and well known manner. The T-shaped arcuate valves 44 and 49 of the supercharger frictionally engage the walls of the cylinder and therefore lag behind the motion of the piston. On the down stroke of the piston, the members 44 and 49 rest in the tops of their respective grooves, as illustrated in Figure 1. The tongue of the member 44 closes off the passageway 41 to prevent the passage of air therethrough, but the tongue of the member 49 is carried centrally in the groove 47 so that air passes freely around the same. Consequently, the downward motion of the piston expels air from the crank case out through the ducts 48 and 46 into the recess 30 from whence it flows into the manifold 35.

On the return or up stroke of the piston, the valve members 44 and 49 will lie in the bottoms of their grooves, and this time the tongue of the member 44 will be positioned midway in its groove so as to leave the passageways 41 and 43 unobstructed, while the tongue of the member 49 will seat over the passageway 48 to close off the same. The air will therefore be prevented from returning from the manifold 35 to the crank case, and fresh air will be admitted from the manifold 32 into the recess 29 from whence it will flow through the ducts 41 and 43 into the crank case. This cycle of operation is repeated each up and down stroke of the piston to continuously pump air through the crank case and into the manifold 35.

The air thus compressed and delivered to the manifold 35, passes through the carburetor 37, where it is mixed with fuel in the usual manner and is admitted under control of the butterfly valve 66 to the intake manifold 61 of the engine. The fuel mixture is admitted to the combustion chamber 56 under control of the intake valve 58, it being admitted thereto during each alternate downward movement of the piston. Inasmuch as the air is delivered from the crank case to the manifold 35 during each down stroke motion of the piston, and the same is admitted to the combustion chamber during only one of every two down stroke motions of the piston, the volumetric delivery of the air from the crank case is greater than the volumetric delivery of air to the combustion chamber. Some compression therefore necessarily takes place prior to its delivery to the combustion chamber 56, with the result that the engine is supercharged.

The several manifolds 35 and 61 are common to all the cylinders of the engine. Each separate piston acts as a separate individual compressor delivering compressed air to the common manifold 35 with the result that a greater supercharging effect is obtained than could be possible with each cylinder acting entirely by itself. Assuming a four cylinder motor, two pistons will always be descending at the same time, only one of which will be receiving fuel into its combustion chamber, with the result that air is displaced from below both of these pistons into the space above a single piston. Thus the supercharging, that is, the compression of the air, is accomplished in a single stroke of the compressor, rather than in two successive strokes as are required in a single cylinder engine. In engines having more than four cylinders there is considerably more overlapping of the action of the several separate compression chambers with the result that the flow of air is smoothed out even more and the air within the manifolds 35 and 61 remains at a more constant pressure. This eliminates momentary peaks of back pressure in the manifold 35 at the end of each compression stroke so that individual compressors may work at a higher efficiency and thus produce a greater supercharging effect.

When the direction of motion of a piston changes, it is desirable that the operation of the valves 44 and 49 be such that the open valve closes before the closed valve opens. If this were not so then both valves might be open at the same time, thus opening the manifold 35 to the atmosphere. This action is obtained by the valve arrangement shown in Figure 1, as may be seen from the following consideration. When the piston 17 is descending it compresses the air in the crank case with the result that the pressure on the lower side of the sealing ring 53 is above atmospheric pressure while, of course, the pressure on the upper side of this ring is atmospheric pressure. At this time the valve 49 is open and therefore the pressure on both sides of the corresponding ring of this valve is the same. This condition prevails throughout the entire downward movement of the piston. As the piston commences to move upwardly the superior pressure on the lower side of the valve ring 53 causes it to be drawn with the piston upon the initial slow upward motion of the piston. During this time the valve 49 closes. A moment later, as the piston gains speed, the valve 44 opens. This condition then prevails throughout the entire upward stroke. During this upward stroke the pressure on both sides of the ring 53 is the same, since this valve is now open, while the pressure on the two sides of the valve ring of the valve 49 is different, since at this time the lower side of the valve ring of the valve 49 is subject to the atmospheric pressure of the crank case, whereas the upper side is subject to the superior pressure of the manifold 35. It is to be recalled that at this time the valve 49 is in its lowered position. When the piston reaches its uppermost position and first starts downward, the superior pressure on the upper side of the stem of the valve 49 will tend to cause this valve to be first slightly drawn with the piston, while no corresponding action takes place on the valve stem 53 since both sides of this stem are exposed to atmosphere. The valve 44 therefore immediately closes and, a moment later, as the piston gains speed, the valve 49 opens. This delay in the opening of the valve 49 has another distinct advantage in that during this period there is some compression of the air in the compartment below the piston 17 and therefore, when the valve does open, the difference in pressure between this air and the air in the manifold 35 is smaller than it would otherwise be, resulting, therefore, in less variation in pressure within the manifold 35.

Figure 4:
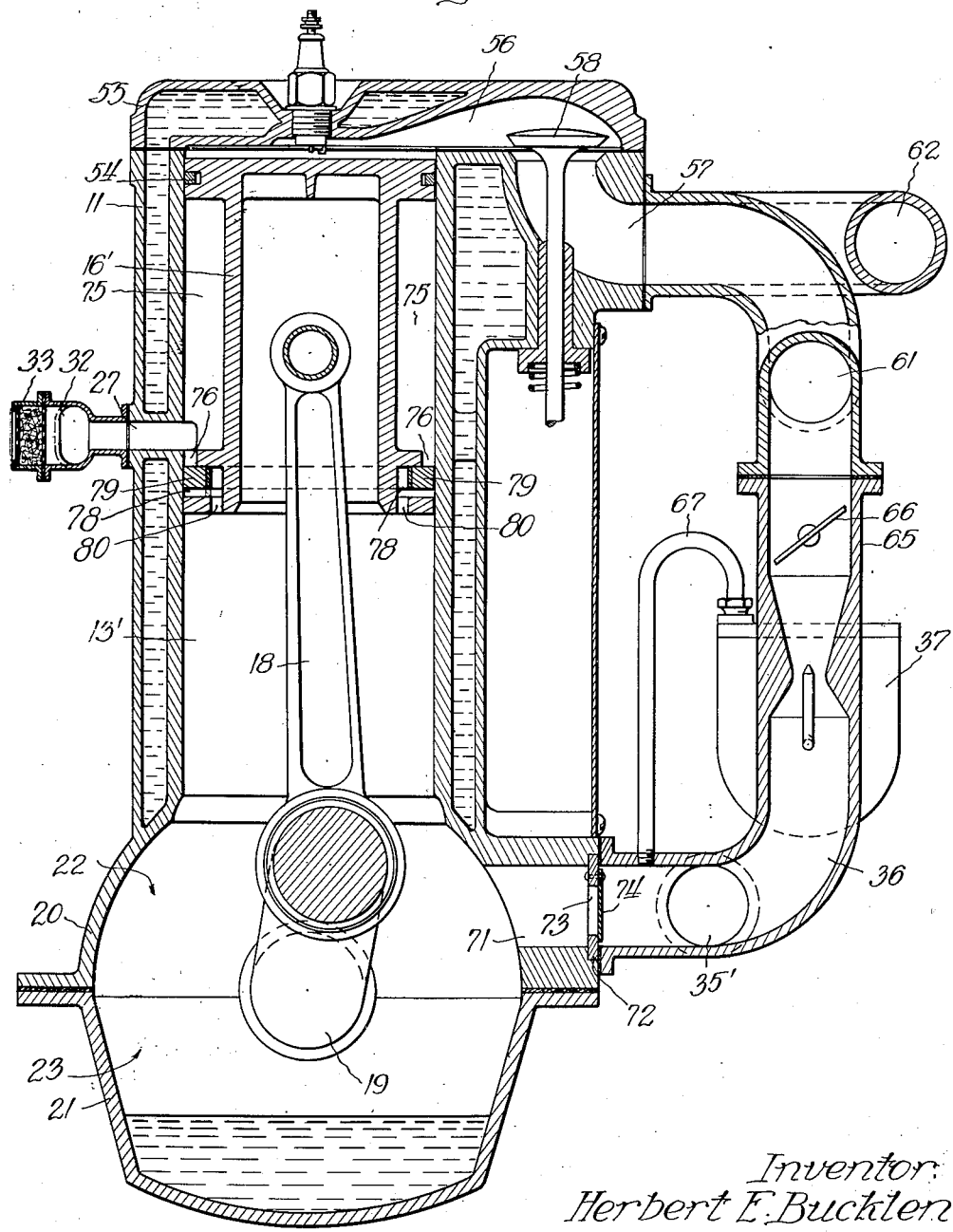
Figure 4 is a sectional elevation of a modified engine embodying the principles of my present invention.

In Figure 4 I have illustrated an engine of a modified construction for carrying out the principles of my present invention. It differs from the device of Figure 1 principally in the arrangement of the compressor valves.

The piston 16' contains a single annular recess 75 which communicates with the intake port 27. An annular groove 78 is located just below the recess 75 and communicates with the same through a clearance space 76 between piston and the cylinder wall. The groove 78 contains a valve ring 79 which is shiftable therein to open and close the passageway 76. Leading out of the lower side of the groove is a series of apertures 80 which open into the compression space below the piston. These apertures are so located that they cannot be covered by the valve ring 79 at any time during the operation of the engine.

This arrangement constitutes the intake valve of the supercharging compressor.

The outlet port of the compressor is indicated by the reference numeral 71 and communicates with the compressed air manifold 35' through the check valve 72. The valve 72 comprises essentially a perforated metal plate, the openings 73 of which are provided with light metal flaps 74 on the downstream side, that is, on the side facing the manifold 35'. These flaps are slightly resilient and normally lie over the openings 73 to close the same. Any slight excess of pressure in the crank case over that in the manifold 35' will move the flaps away from the openings to permit the passage of air therethrough, but any excess of pressure in the manifold will hold the flaps tightly seated over the openings.

The other details of the engine are essentially the same as in the device of Figure 1.

In operation the ring valve member 79 of the intake valve frictionally engages the walls of the cylinder so that it lags behind the motion of the piston. As the piston moves downward in the cylinder the ring 79 lies in the top of the groove 78 to close off the passageway 76, as shown in the drawings, so as to compress the air within the crank case and to force it out through the check valve 72 into the air manifold 35'. During the upward motion of the piston, the ring member 79 lies in the bottom of the groove 78 so as to leave the passageway 76 open and to permit communication therethrough from the recess 75 into the groove 78, and from there through the apertures 80 into the crank case to admit air thereto from the outside. The valve 72 is held closed by the pressure in the manifold 35' to retain the compressed air therein during the upward stroke of the piston.

This operation is repeated each up and down stroke of the piston so as to continuously compress the air for supercharging the engine.

In Figure 5 I have illustrated a modified form of valve arrangement for an engine such as is shown in Figure 1. Inasmuch as this construction is in other respects the same as that shown in Figure 1, I have here illustrated only the valve arrangement and have indicated similar parts by the same reference numerals used in Figure 1. The valves 44 and 49 of Figure 1 are here replaced by breather or check valves 90 and 91. The valve 90 closes the port 43 during the downward movement of the piston 17, whereas the valve 91 closes the port 48 during the upward movement of the piston 17. The port 43 communicates with the recess 29, whereas the port 48 communicates with the recess 30, said two recesses being closed off from one another as in Figure 1. The lower flange 93 of the piston 17 may be of appreciable width and be provided with the usual piston ring 94 if desired.

In this embodiment of my invention the flap 90 cannot open as long as the pressure within the crank case is above atmospheric. This is as it should be, since no air can be drawn from the atmosphere into the crank case as long as the pressure within the crank case is above atmospheric pressure. On the other hand, the flap 91 cannot open until the pressure within the crank case is above the pressure within the port 28 that leads to the manifold 35. By this arrangement it is apparent that the fluctuations in pressure within the manifold 35, brought about by the opening and closing of the valve of the piston 17, are substantially reduced.

While I have shown and described a few preferred embodiments of my present invention it is to be understood that the invention is not limited to the precise constructions herein shown, the same being merely illustrative of the principles of my invention.

What I consider new and desire to secure by Letters Patent is:

1. A multi-cylinder four-stroke-cycle internal combustion engine comprising, a plurality of cylinders, means including reciprocable pistons for defining a combustion chamber in one end of each of said cylinders and for defining a compression space in the other end thereof, means including arcuate valves extending into grooves in the pistons and sliding on the cylinder walls, for admitting a gas to said compression spaces to be compressed therein, manifold means for receiving the compressed gas from said spaces and means conducting said gas to said combustion chambers.

2. In an internal combustion engine, a piston comprising a head portion, a skirt containing a pair of separate recesses and separate duct means leading from said recesses to the space below said piston, and alternately operable valve means in said ducts.

3. An internal combustion engine comprising a cylinder, a piston therein having an end face defining the end of an explosion chamber, the periphery of the piston together with the cylinder wall defining two additional chambers having outlet ports, and T-shaped arcuate valves carried by the piston and having sliding engagement with the cylinder wall for selectively opening and closing a passageway between the respective chambers and the crank case of the engine.

4. A four stroke cycle internal combustion engine having a cylinder, a piston therein, a crank case at one end of the cylinder, an air inlet port for the crank case, an air outlet port for the crank case, valves for said ports, said valves being mounted on the piston and sliding on the cylinder wall, the air inlet port being opened during movement of the piston outward from the crank case and closed during its movement inward of the crank case, the air outlet port being closed during movement of the piston outward from the crank case and opened during movement of the piston inward of the crank case, and a carburetor supplying a fuel-air mixture to the cylinder, said carburetor having an air inlet port receiving air from the outlet port of the crank case.

5. A four stroke cycle multi-cylinder engine wherein each power unit comprises a cylinder member and a piston member dividing the cylinder member into an explosion chamber and a compression chamber, and wherein one of the elements of combustion is compressed on alternate strokes of the piston member and supplied to the explosion chamber once for each four strokes of the piston member, and wherein valve means control the intake and outgo of the element of combustion from the compression chamber, characterized in that at least one of the valve means comprises an arcuate passageway in one of the members and, in the passageway, an arcuate valve having frictional engagement with the other member as the piston member moves in the cylinder member, said arcuate valve being moved to its open and closed positions by the frictional force as the piston moves in the cylinder.

6. A four stroke cycle multi-cylinder engine comprising a plurality of cylinders closed at each end, a piston in each cylinder dividing it into an explosion chamber and a compression chamber, intake ports for said compression chambers, a manifold, outlet ports connecting the respective compression chambers to the manifold, and intake and outlet valves controlling the respective ports, certain of said valves being located in arcuate grooves in the pistons and actuated by frictional engagement with the cylinder walls as the pistons reciprocate in the cylinders.

HERBERT E. BUCKLEN.